No. 792,478. PATENTED JUNE 13, 1905.
L. V. THAYER.
MOLDING MACHINE FOR CONCRETE BUILDING BLOCKS.
APPLICATION FILED NOV. 3, 1904.

4 SHEETS—SHEET 1.

WITNESSES
Mildred A. Kelly
E. Peterson

INVENTOR
Lewis V. Thayer
By J. W. Powers
Atty

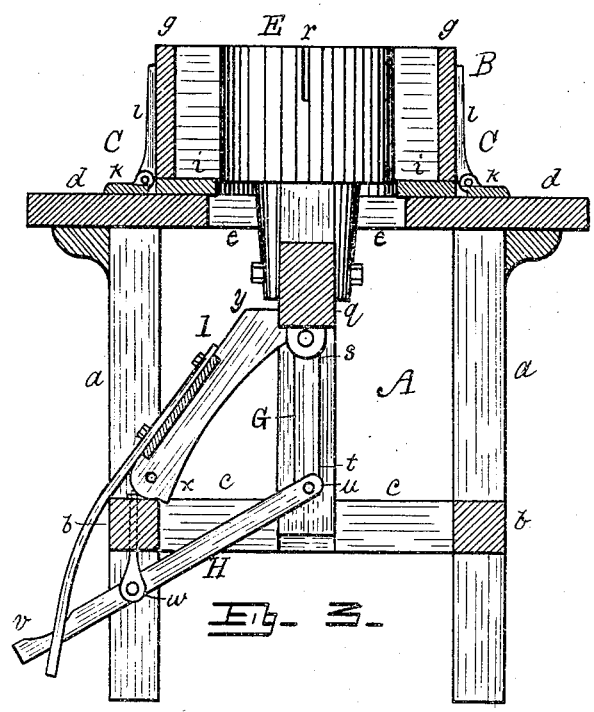
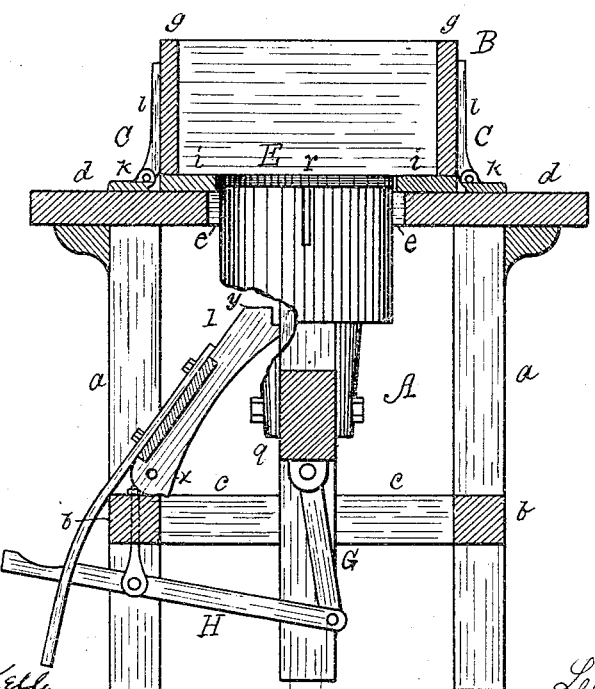

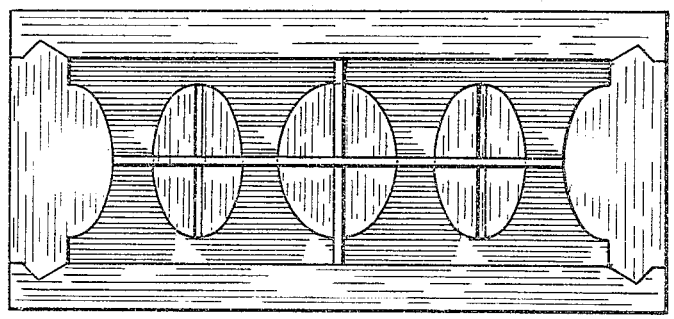
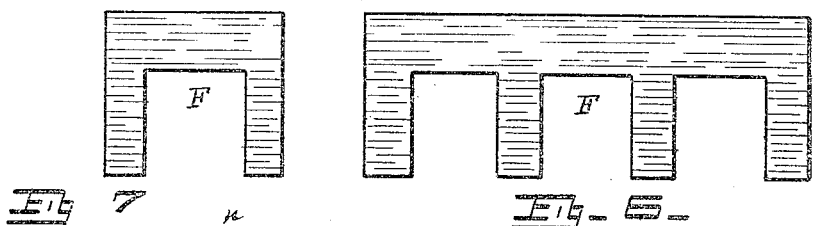
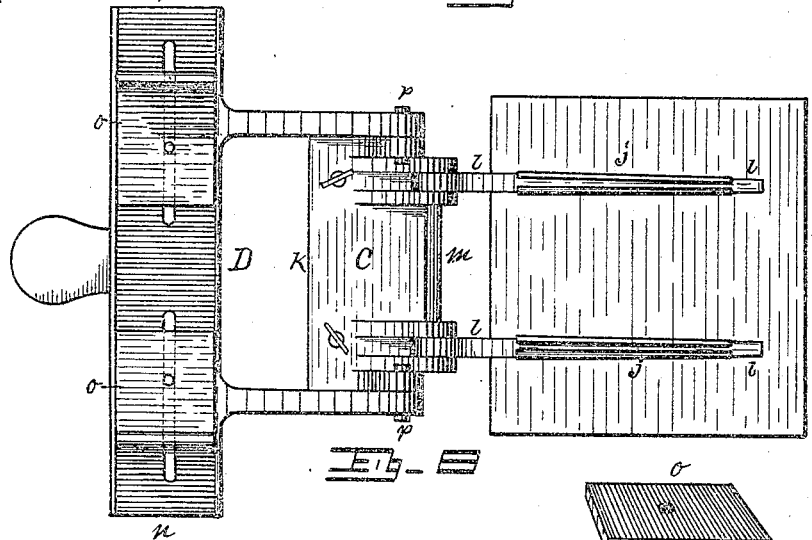
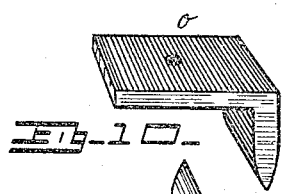
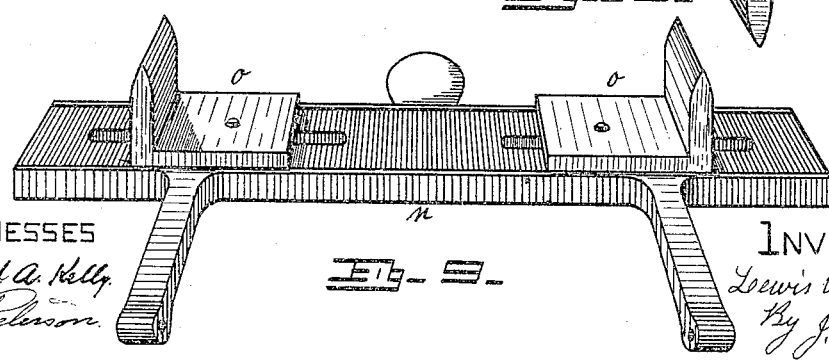

No. 792,478. PATENTED JUNE 13, 1905.
L. V. THAYER.
MOLDING MACHINE FOR CONCRETE BUILDING BLOCKS.
APPLICATION FILED NOV. 3, 1904.
4 SHEETS—SHEET 4.
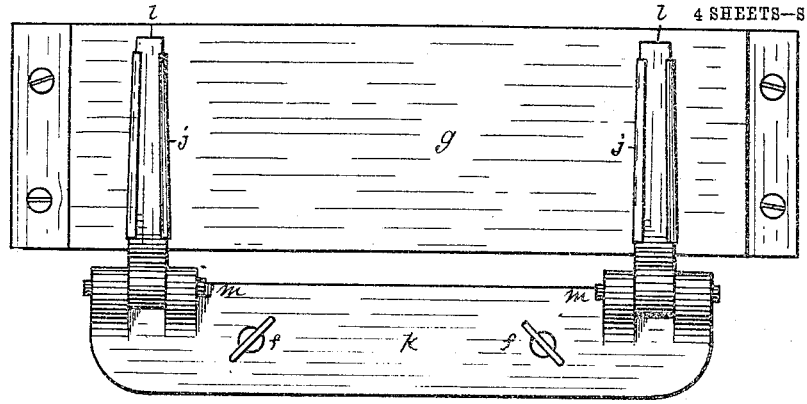
Fig. 11.
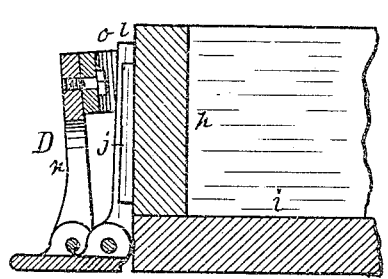
Fig. 13.
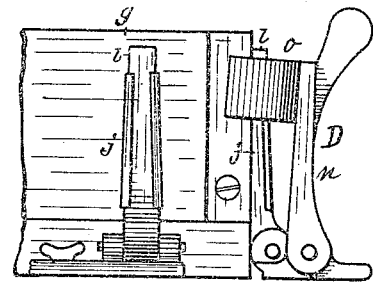
Fig. 12.
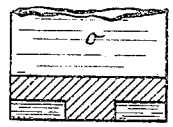
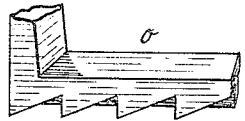
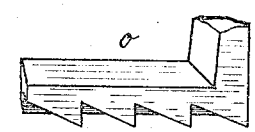
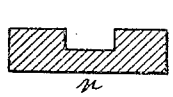
Fig. 14.
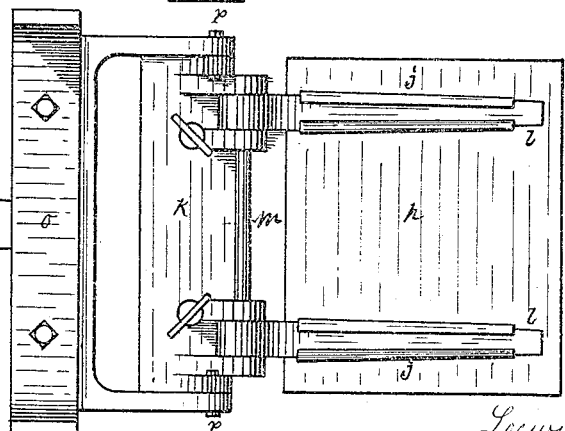
Fig. 15.
WITNESSES
Mildred A. Kelly
E. Peterson
INVENTOR
Lewis V. Thayer
By J. W. Powers
Atty No. 792,478.

Patented June 13, 1905.

UNITED STATES PATENT OFFICE.

LEWIS V. THAYER, OF MINNEAPOLIS, MINNESOTA.

MOLDING-MACHINE FOR CONCRETE BUILDING-BLOCKS.

SPECIFICATION forming part of Letters Patent No. 792,478, dated June 13, 1905.

Application filed November 3, 1904. Serial No. 231,305.

*To all whom it may concern:*

Be it known that I, LEWIS V. THAYER, of Minneapolis, in the county of Hennepin and State of Minnesota, have invented certain new and useful Improvements in Molding-Machines for Concrete Building-Blocks, of which the following is a full, clear, and exact description, reference being had to the accompanying drawings, which form an important part of this specification.

My invention relates to fireproof construction, and has for its object the production of a light, strong, cheap, and simple molding-machine wherein and by which concrete building-blocks may be molded upon the building-site, thereby effecting a saving in transportation charges upon the finished product.

To this end my invention consists of the device clearly illustrated in the before-mentioned drawings, fully described in the following paragraphs of this specification, and particularly pointed out in the subjoined claims.

My invention relates in general to devices for molding concrete building-blocks and in particular to devices having adjustable cores therein, and therefore adapted to the production of hollow blocks.

Figure 1:
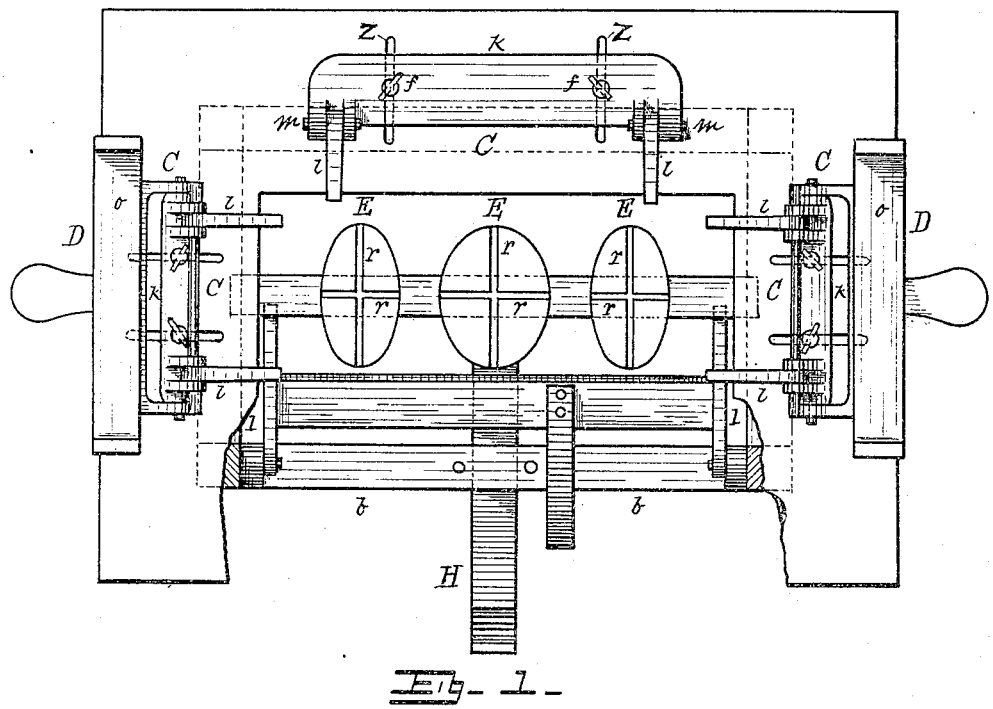
Figure 2:
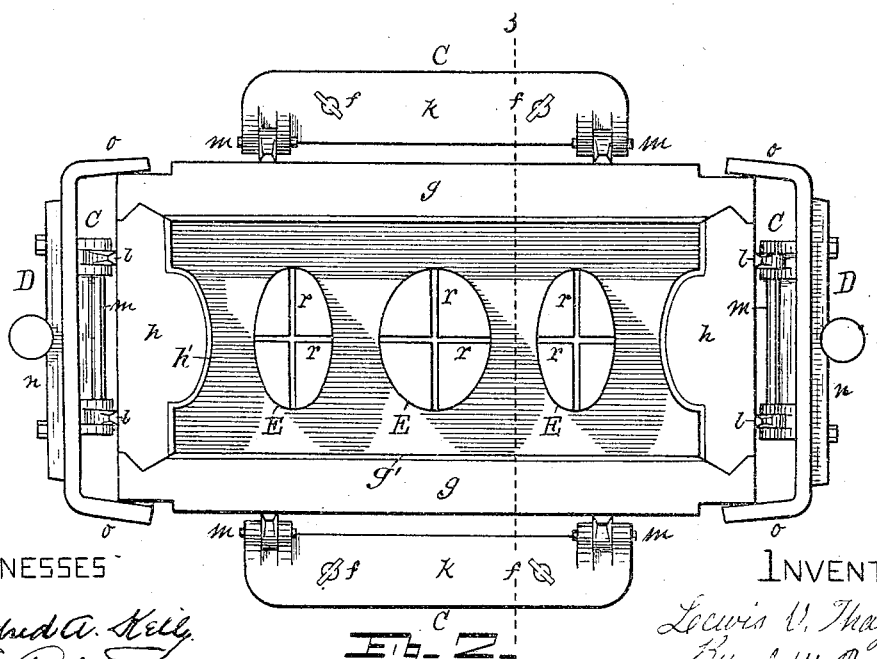

In the drawings referred to, Figure 1 is a top or plan view of my molding-machine without the side or end pieces; Fig. 2, the same with the side and end pieces; Fig. 3, a vertical section of Fig. 2, taken on the line 3 3, the cores being shown in their raised position. Fig. 4, the same, the cores being shown in their lowered position; Fig. 5, a top view of the box, showing the dividing-bars in position for making divided blocks; Fig. 6, a side elevation of the longitudinal dividing-bar; Fig. 7, the same of one of the transverse dividing-bars; Fig. 8, a side elevation of one of the end pieces of flask, a top view of the hinge-plate to which the same is connected, and the adjustable clamp therefor; Fig. 9, a perspective of the adjustable clamp; Fig. 10, a detail, being a perspective of one of the jaws of the adjustable clamp; Fig. 11, a side elevation of one of the side pieces and a top view of the hinge-plate to which the same is pivotally connected; Fig. 12, a fragmentary section showing a portion of the side piece of flask, one of the hinges to which the same is pivotally affixed, and an end elevation of the clamp therefor; Fig. 13, another fragmentary section showing end elevation of hinge and vertical sections of bottom and end pieces of flask and clamp; Fig. 14, a group of sectional and perspective views of portions of a clamp of modified construction; and Fig. 15 a side elevation of one of the end pieces of flask, a top view of the hinge-plate to which the same is pivotally connected, and a single jaw-clamp.

Similar letters refer to similar parts throughout the several views.

A is the frame; B, the flask; C, the hinges; D, the clamp; E, the cores; F, the dividing-bars; G, the connecting-rods; H, the treadle, and I the pawls.

The frame A consists of the posts or legs $a$, the longitudinal beams $b$, the transverse beams $c$, and the top piece $d$. This top piece $d$ is provided with slots $z$, adapted to receive the clamping-bolts $f$, which serve to adjustably affix the hinges C thereto, and with an opening $e$, through which the cores E may pass in their upward and downward movements, as will hereinafter be set forth.

The flask B consists of the side pieces $g$, the end pieces $h$, and the bottom piece $i$, which may be fashioned of metal; but I prefer to make them of wood and reinforce them with metal. The two first-named parts, the side pieces $g$ and the end pieces $h$, are respectively provided upon their outer faces with the transverse loops $j$, adapted to receive the strap portions of the hinges C, hereinafter described, and upon their inner faces with the metal plates $g'$ and $h'$, which plates form a lining for my flask B.

The hinges C consist of the plate portions $k$, the strap portions $l$, and the pin portions $m$. The plate portions $k$ are adjustably affixed to the top piece $d$ of the frame A by means of the before-mentioned clamp-bolts $f$, and the strap portions $l$ are pivotally affixed to the plate portions $k$ by means of the pins $m$ in the usual manner of constructing this type of hinges.

The clamp D consists of the longitudinally-slotted beams $n$, the longitudinally-movable jaws $o$, adjustably connected thereto, and the hinge-pins $p$, connecting them to the hinge-plates $k$ of the hinges C.

The cores E consist of vertical blocks of any desired configuration and of any suitable material, which blocks are mounted upon and affixed to a horizontal beam $q$, which beam in turn is recessed in and vertically movable within the frame A. The upper portions of the vertical walls of these cores E are transversely divided by means of the slits $r$, and are thus adapted to receive the dividing-bars F, as will hereinafter be set forth.

The dividing-bars F consist of metal plates as wide as the side and end pieces $g$ and $h$ of the flask B. They are notched out on their lower edges, thus adapting them to be received in the slits $r$ of the cores E and to divide the flask B either longitudinally or transversely.

The connecting-rod G consists of a vertical member, the upper end $s$ of which is pivotally affixed to the horizontal beam $q$, which beam supports the cores E and the lower end $t$ of which is pivotally affixed to the treadle H, hereinafter described.

The treadle H consists of a horizontally-arranged member, the inner end $u$ of which is pivotally affixed to the lower end of the connecting-rod G, the outer end $v$ of which extends outward and beyond the front of the frame A, and the intermediate portion $w$ of which is pivotally affixed to one of the horizontal members $b$ of the said frame A.

The pawls I (preferably two in number) consist of oblique-arranged members, the lower ends $x$ of which are pivotally connected to the vertical posts $a$ of the frame A and the upper ends $y$ of which normally impinge the front face of the horizontal beam $q$, which beam supports the cores E. The upper ends of these pawls I are notched, as shown in Fig. 4, thus adapting them to engagement with the under side of the horizontal beam $q$ when the same shall have been raised to its upper position, as shown in Fig. 3, thereby locking it in place.

I operate my machine as follows: I first place the bottom piece $i$ of the flask B upon the frame A, being particular to have the openings therein register with the cores E. I then affix the side pieces $g$ and the end pieces $h$ to the straps $l$ of the hinges C by sliding them laterally thereon, the loops $j$ of the said side and end pieces engaging the straps $l$ of the said hinges. I now raise the end pieces $h$ to a vertical position, then raise the side pieces $g$ to a vertical position and against the ends of the said end pieces, and secure them in place by means of the clamps D, the jaws $o$ of which close upon the outer faces of the said side pieces $g$. I now place my foot upon the outer end of the treadle H, and thereby raise the cores E to the position shown in Fig. 3, when the pawls I (operating by gravity) will automatically lock the horizontal beam $q$ in place, thereby supporting the cores E in their then upper position. I then fill my flask B with concrete (dampened cement and sand) and ram it down, strike off my flask, (remove all concrete extending above the side and end pieces,) release the pawls I, and let the cores E drop to their lower position, (the position shown in Fig. 4,) release the clamps D, let my side and end pieces down to a horizontal position upon the frame A, and remove the bottom piece $i$ and with it the molded block. In molding divided or half-blocks I proceed in the manner above described, save and excepting that I insert the dividing-bars F before filling my flask.

My purpose in having the side and end pieces of the flask B detachable from the hinges C is that I may use other side and end pieces than those herein shown—as, for instance, carved or molded pieces or those made in imitation of "rough-cut" stone and the like.

What I claim as new, and desire to secure by Letters Patent, is—

1. In a molding-machine of the character herein shown and described, the combination with the frame, of hinges adjustably affixed to the said frame; side and end pieces loosely affixed to and removable from the said hinges, a horizontal beam vertically movable in the said frame; cores mounted upon and vertically movable with the said beam; a treadle pivotally affixed to the said frame, a connecting-rod uniting the said horizontal beam and the said pedal; and pawls adapted to support the said horizontal beam in its uppermost position, all substantially as shown and described.

2. In a molding-machine of the character herein shown and described, the combination of the frame having a transversely-slotted top piece, hinges adjustably affixed to the said top piece, side and end boards loosely connected to the said hinges, and clamps pivotally affixed to the said hinges, said side and end pieces being adapted when in a vertical position to form a flask, and said clamps being adapted to bind the same together, substantially as shown and described.

3. In a molding-machine of the character herein shown and described, the combination with the frame having a vertically-pierced and transversely-slotted top piece, of a pair of transversely-arranged hinges adjustably affixed to the said top piece; side pieces loosely affixed to the said adjustable hinges; a pair of transversely-arranged hinges rigidly affixed to the said top piece; end pieces loosely affixed thereto and clamps pivoted to the said hinges; said side pieces being adapted to lateral adjustment upon the said top piece; said end pieces being interchangeable for longer or shorter end pieces; and said clamps being extendible and adapted to embrace the said side pieces either in their extended or contracted position when the same are raised to a vertical position, substantially as shown and described.

4. The combination of the side and end pieces $g$ and $h$ provided with the loops $j$; the strap portions $l$ of the hinges C adapted to engagement with and releasement from the said loops $j$; and the hinges C adapted to adjustable engagement with the frame A, substantially as shown and described.

5. The clamp D consisting of the longitudinal beam portion $n$, the longitudinally-movable jaws $o$ adjustably affixed thereto, means for clamping the said jaws to the said beam portion, and a pin for pivotally affixing the said beam portion to the hinge C, substantially as shown and described.

6. The side and end pieces $g$ and $h$ provided upon their outer faces with the transverse loops $j$ adapted to engagement with the strap portions $l$ of the hinges C, and upon their inner faces with the metal plates $g'$ and $h'$ adapted to serve as a lining for the flask B, substantially as shown and described.

LEWIS V. THAYER.

Witnesses:
C. A. P. TURNER,
H. L. HARVEY.